United States Patent [19]

Natusch et al.

[11] Patent Number: 4,809,218
[45] Date of Patent: Feb. 28, 1989

[54] APPARATUS AND METHOD FOR INCREASED SYSTEM BUS UTILIZATION IN A DATA PROCESSING SYSTEM

[75] Inventors: Paul J. Natusch, Westford; David C. Senerchia, Shrewsbury; John F. Henry, Jr. deceased, late of Townsend, all of Mass., by Beverly A. Henry, administratrix

[73] Assignee: Digital Equipment Corporation, Maynard, Mass.

[21] Appl. No.: 823,801

[22] Filed: Jan. 29, 1986

[51] Int. Cl.[4] .............................................. G06F 12/02
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,368,207 | 2/1968 | Beausoleil et al. | 364/200 |
| 4,104,721 | 8/1978 | Markstein et al. | 364/200 |
| 4,245,303 | 1/1981 | Durvasula et al. | 364/200 |
| 4,247,894 | 1/1981 | Beismann et al. | 364/200 |
| 4,290,102 | 9/1981 | Levy et al. | 364/200 |

OTHER PUBLICATIONS

McFarland; High Speed Data Bus Structure and System; 28APR83; WO83/01544.

*Primary Examiner*—Thomas M. Heckler
*Attorney, Agent, or Firm*—Finnegan, Henderson, Farabow, Garrett, & Dunner

[57] ABSTRACT

In a data processing system having a multiple write command and a masked write command, a plurality of signal groups can be transferred from a data processing subsystem to a memory unit on consecutive system cycles. Associated with each signal group and applied to lines used to transfer mask signals are control signals that designate when the associated signal group is to stored in the memory unit. When the multiple write command is issued, the apparatus coupled to the mask signal lines is enabled and the control signals can be identified. When the control signals are identified, the operation storing the associated signal group is inhibited.

1 Claim, 6 Drawing Sheets

APPARATUS AND METHOD FOR INCREASED SYSTEM BUS UTILIZATION IN A DATA PROCESSING SYSTEM

RELATED APPLICATIONS

This application is related to the following Patent Applications, all of which were filed in the U.S. Patent and Trademark Office on the filing data of the present Patent Application.

APPARATUS AND METHOD FOR PROVIDING DISTRIBUTED CONTROL IN A MAIN MEMORY UNIT OF A DATA PROCESSING SYSTEM; U.S. Patent Application Ser. No. 06/823,687; filed Jan. 29, 1986: by Paul J. Natusch; Eugene L. Yu; David C. Senerchia; and Beverly A. Henry as Administratrix of the Estate of John F. Henry, Jr., Deceased.

APPARATUS AND METHOD FOR ADDRESSING SEMICONDUCTOR ARRAYS IN A MAIN MEMORY UNIT ON CONSECUTIVE SYSTEM CLOCK CYCLES; U.S. Patent Application Ser. No. 06/823,951, filed Jan. 29, 1986: by Paul J. Natusch; David C. Senerchia; and Beverly A. Henry as Administratrix of the Estate of John F. Henry, Jr., Deceased.

APPARATUS AND METHOD FOR RESPONDING TO AN ABORTED SIGNAL EXCHANGE BETWEEN SUBSYSTEMS IN A DATA PROCESSING SYSTEM; U.S. Patent Application Ser. No. 06/823,775; filed Jan. 29, 1986: by Robert E. Stewart; James B. Keller; Paul J. Natusch; Eugene L. Yu; and Beverly A. Henry as Administratrix of the Estate of John F. Henry, Jr., Deceased.

BACKGROUND OF THE INVENTION

1. Field of the Invention

This invention relates generally to data processing systems and more particularly to the exchange of logic signals on a system bus in the data processing system. As techniques have been found to increase the performance of the main memory system, increased transfer of data over the system bus is necessary to utilize the enhanced main memory capability.

2. Description of the Related Art

Referring to FIG. 1, a typical data processing system configuration is shown. The data processing system includes at least one central processing unit 10 (or 11), at least one input/output unit 13 (or 14), a memory unit 15 and a system bus 19 coupling the plurality of units (or subsystems) of the data processing system. The central processing unit processes groups of logic signals according to software and/or firmware instructions. The logic signal groups to be processed as well as the program instruction sequences can typically be stored in the memory unit 15. A console unit 12 can be coupled to the central processing unit(s) and includes the apparatus and stored instructions to initialize the system. The console unit can be used as a terminal during the operation of the data processing system. The input/output units provide the interface between the data processing system and terminal units, mass storage units, communication units, and any other units to be coupled to the data processing system.

Referring next to FIG. 2, a block diagram of a typical main memory system found in the related art is shown. The main memory unit 15 includes a memory interface unit 21 that exchanges signals with the system bus 19. The memory interface unit 21 is coupled to an array bus 22 and the memory unit bus 22 has at least one memory array unit 26 coupled thereto. The memory array units are comprised of a plurality of logic signal storage elements organized in groups so that each group of storage elements can be accessed by a unique address logic signal group. The memory interface unit 21 includes the apparatus for controlling the exchange of logic signal groups, identified by an address logic signal group, between the memory arrays and the system bus. The memory interface unit 21 includes apparatus for identifying activity on system bus 19 directed to the memory unit as well as apparatus for returning logic signal groups to the subsystems transmitting requests for the signal groups. Buffering of the data signal groups, error correction and generation of control signal are also typically performed in the memory interface unit 21.

The use of the system bus in a data processing system provides flexibility by allowing a variable number of subsystems to be coupled to the system bus and therefore a multiplicity of configurations are possible. However, the exchange of signal groups between the data processing subsystems is constrained to take place on the system bus. A protocol is typically established that permits each data processing subsystem to have access to the system bus in a manner that permits the interaction between requisite subsystems while avoiding conflicts between the subsystems. The protocol can severely limit the bus activity. In addition, as the number of subsystems coupled to the system bus increases, the access to the system bus can be a limiting factor in the performance of the data processing system. The problem is especially severe in the "write through" data processing systems where all the data signal groups generated by the central processing unit are stored into the main memory.

The exchange of data signal groups between a central processing unit and a main memory unit can be classified into three groups; write operations in which signal groups from the central processing unit are stored in the main memory unit, read operations in which signal groups are transferred from a main memory unit to a central processing unit, and a read modify write in which signal groups already stored in the main memory unit are partially replaced by signals from a central processing unit. This last operation is typically referred to as a masked write operation, because signals called mask signals that identify the signals of the signal group stored in main memory unit to be replaced are transferred from the central processing system along with the signals to be stored. As is well known, the masked write operation is more time consuming than the read or write operation. Associated with each operation is a command that is transferred to the main memory subsystem to notify the main memory subsystem of the type of action required. In particular, the masked write command causes the apparatus of the main memory unit to be responsive to the mask signals and begin a read operation of the data signal group to be merged with the incoming data signal group.

In order to increase the system bus usage, multiple write commands, command that transfer a plurality of consecutively addresse signal groups to be written (stored) to the main memory on consecutive system clock cycles, can be employed. This procedure can improve the system bus utilization. However, many situations can arise where the multiple write procedure is not applicable, such as when a system need write only three data signal groups in a sequence of four. System bus utilization could be improved if a procedure similar to the multiple write operation could be used in the transfer of partially filled sequential signal groups, the improvement being a result of the reduction in the number of system clock cycles that are not directly uesd for signal group transfer.

A need has therefore been felt for apparatus and method for increasing the efficiency of data signal group exchange on the data processing system bus by transferring multiple signal groups in which at least one of the groups in the multiple groups is not to be stored. In addition, a need was felt to perform the multiple group transfer (with missing signal groups) while minimizing additional apparatus to implement the transfer.

SUMMARY OF THE INVENTION

It is an object of the present invention to provide an improved data processing unit.

It is a further object of the present invention to provide a data processing system that can support increased exchange of data signal groups on the system bus.

It is a particular object of the present invention to provide apparatus for permitting a plurality of data signal groups, to be stored in the main memory of the data processing system, to be transferred during consecutive time periods on a system bus in a data processing system.

It is a more particular object of the present invention to provide apparatus that permits a data processing subsystem to transfer and store a plurality of signal groups in main memory, the apparatus also preventing storage of selected signal groups transferred on consecutive cycles.

It is yet another object of the present invention to provide apparatus associated with the main memory unit that can receive a data signal group during consecutive system clock cycles, within at least one of the signal groups is not to be stored in the data processing unit.

The aforementioned and other objects are accomplished, according to the present invention, by providing a data processing system having a command that permits transfer of groups of signals on consecutive system clock cycles and having a command that permits read modify write operations to perform a multiple transfer of signal groups to the main memory unit on consecutive cycles wherein selected ones of the signal groups are not stored in the memory subsystem. The control lines normally used for a mask signal during a masked write operation transfer signals indicating when the associated data signal groups are not to be stored in the main memory unit. Similarly, apparatus normally responsive to the mask signals only during the masked write operation are enabled during the multiple write operation and used to control which of the signal groups applied to the system bus are to be stored in the memory subsystem. To permit the signal groups and the associated control groups to be transferred simultaneously, apparatus is added to inhibit a write operation after the associated control groups have been processed.

These and other features of the present invention will be understood upon reading of the following description along with the drawings.

DETAILED DESCRIPTION OF THE PREFERRED EMBODIMENT

1. Detailed Description of the Figures.

Figure 1:
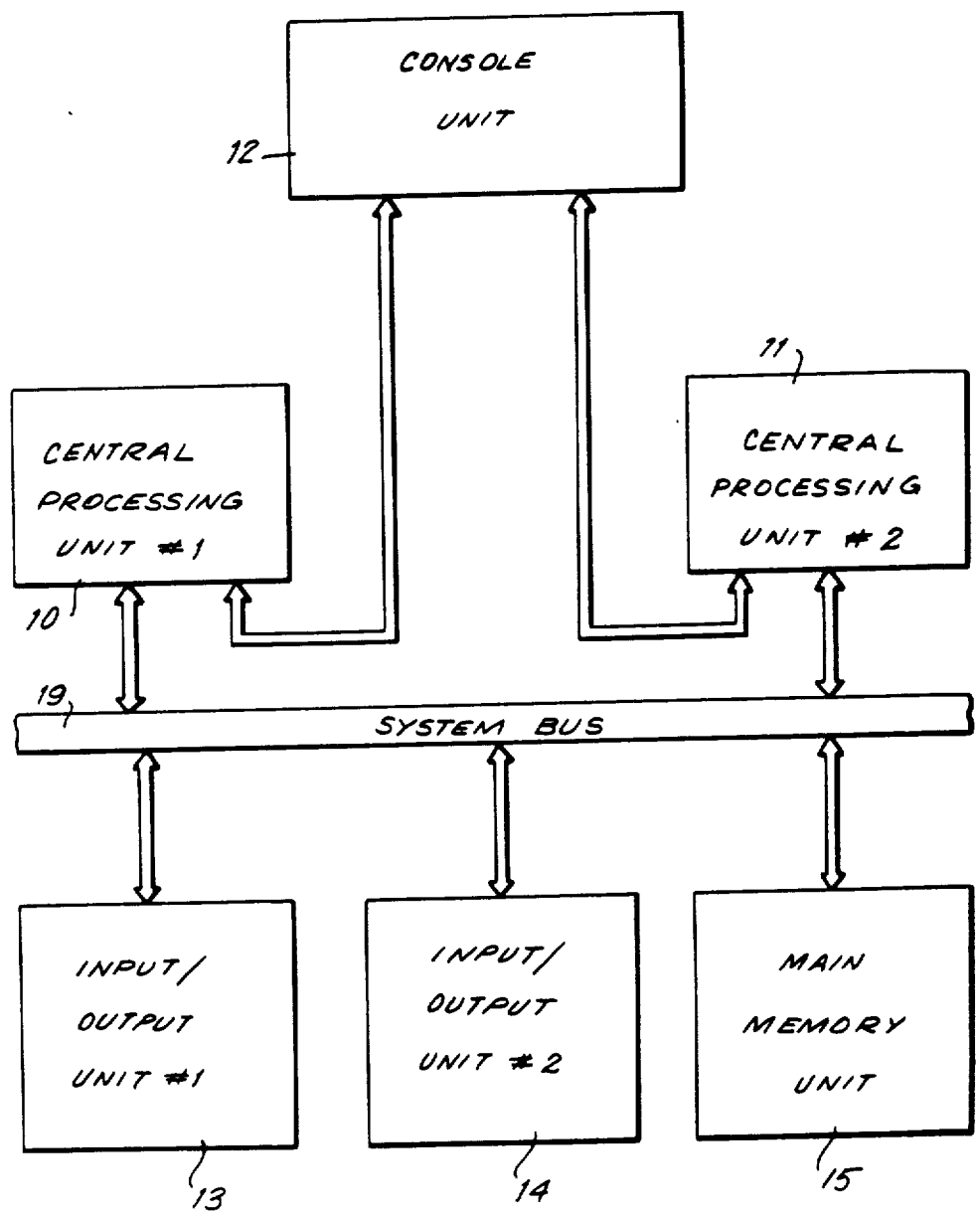
FIG. 1 is a block diagram of the components of a data processing system capable of utilizing the present invention.
Figure 2:
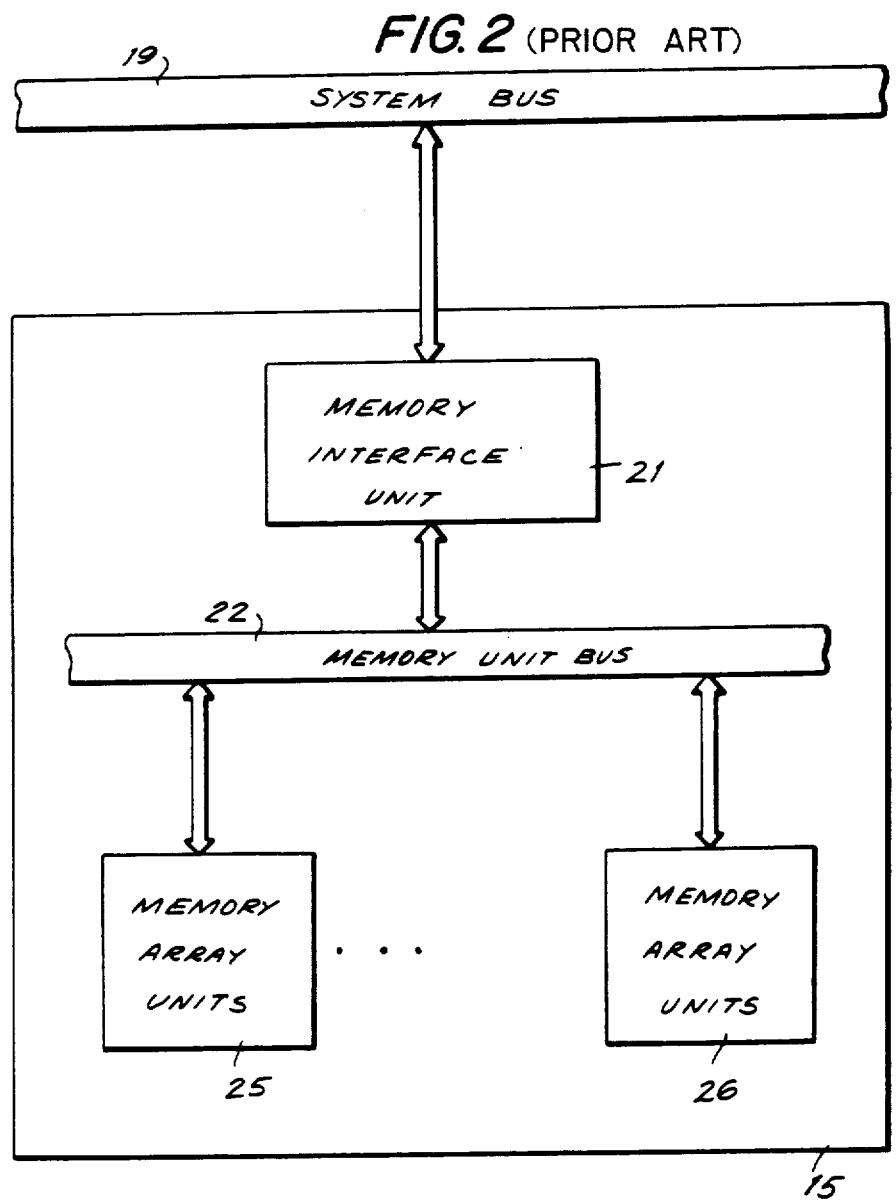
FIG. 2 is a block diagram of a typical data processing system memory subsystem for which the ability to store the data signals groups into the memory subsystem can have an impact on the performance of the data processing system.

FIG. 1 and FIG. 2 have been previously been described with reference to the related art.

Figure 3:
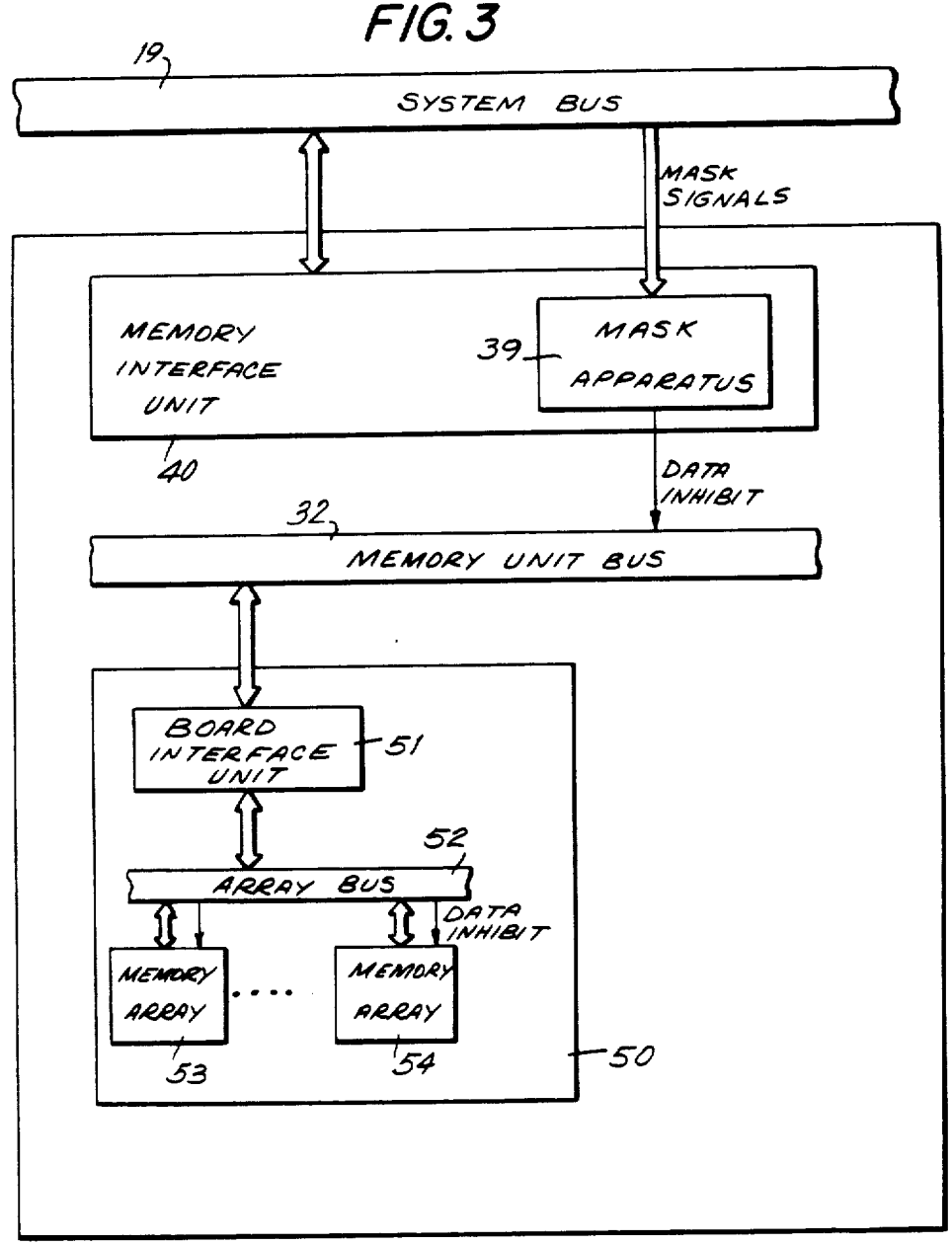
FIG. 3 is a block diagram of a memory subsystem capable of responding to increased system bus utilization or the present invention.

Referring next to FIG. 3, a block diagram of the main memory subsystem capable of using the present invention is shown. The main memory subsystem 15 includes a memory interface unit 40 that couples the main memory subsystem to the system bus 19. The memory interface unit is coupled to and exchanges signals with the memory unit bus 32. The memory unit bus 32, in turn, exchanges logic signal groups with a plurality of memory boards, memory board 50 shown as an example of the relationship of the memory boards with respect to the remainder of the main memory subsystem. The memory boards each include a board interface unit 51 that exchanges logic signals with the memory unit bus 32. The board interface unit 51, in turn, exchanges groups of logic signals with array bus 52, while a plurality of memory arrays, 53 through 54, are coupled to the array bus 52. The memory interface unit 40 includes mask apparatus 39 normally responsive to mask signals from system bus 19. In the present invention, the apparatus 39 is also enabled by all write commands. Upon identification of a predetermined signal (or signals), the memory interface unit 40 transfers an Inhibit signal to control logic associated with the selected memory array. However the issuance of the Inhibit signal by unit 40 is delayed by the need by unit 40 to process the control signals on the mask lines and because the command initiating the write operation precedes the data cycle by at least one clock cycle. Once issued, the Inhibit signal causes the storage of the associated signal group to be aborted.

Figure 4:
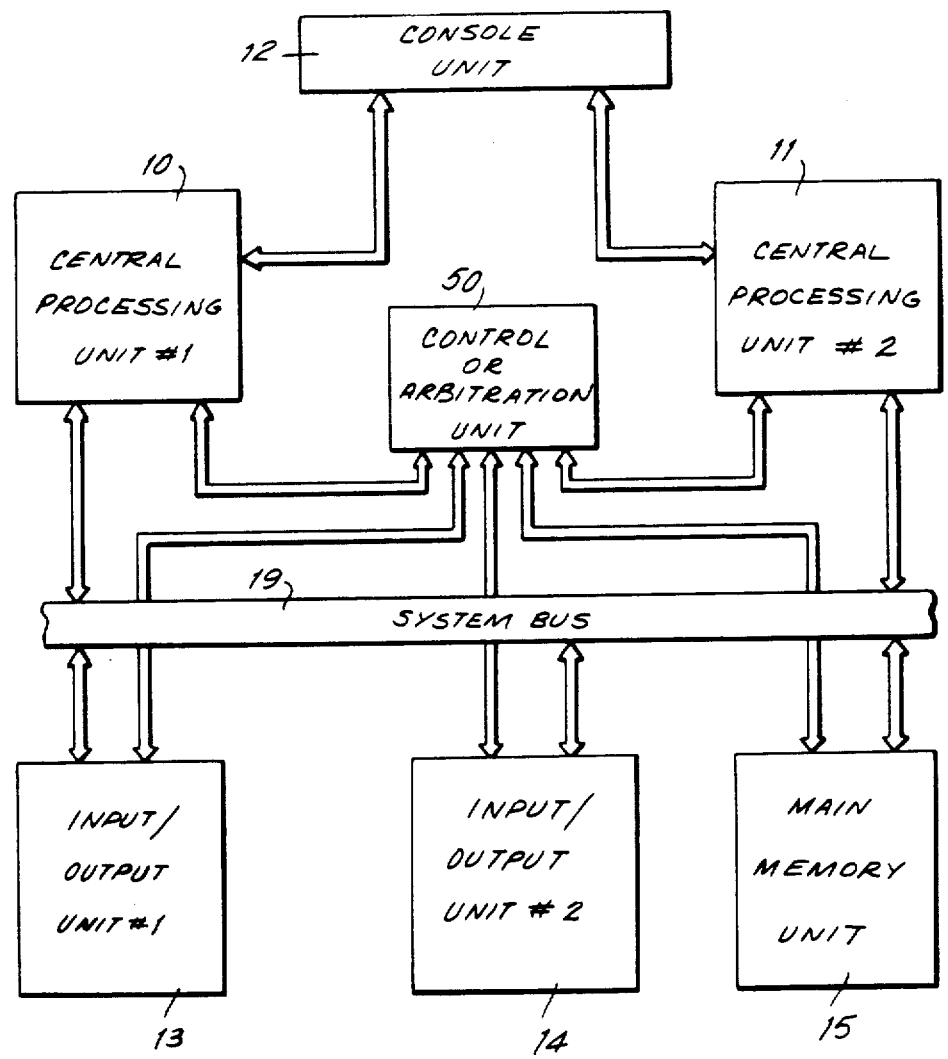
FIG. 4 is a block diagram of a data processing system having an arbitration or control unit to control the activity of the system bus.

Referring next to FIG. 4, the data processing system of FIG. 1 is shown along with an arbitration or bus control unit 50. The bus control or arbitration unit is coupled to each of the subsystems that can apply signals to and receive signals from the system bus 19, i.e. the control unit is coupled to the central processing subsystem(s), the input/output subsystem(s), and the main memory unit(s). The function of the arbitration unit is to control access to the system bus by the data processing subsystems and the operation of the arbitration unit can be understood as follows. When the operation of a data processing unit subsystem requires access to the system bus, the subsystem requiring the access to the subsystem applies a Request signal to the arbitration unit. The Request signal further identifies the requesting subsystem, typically by being applied to the control unit on a dedicated conducting path. Because a plurality of the subsystems may require access to the system bus at any time, the arbitration unit includes decision apparatus that determines which subsystem should have access to the system bus. The algorithm determining the subsystem gaining access to the system bus includes priority considerations, prevention of monopolization of the system bus by a subsystem, and any other factors essential to the efficient operation of the data processing system.

Figure 5A:
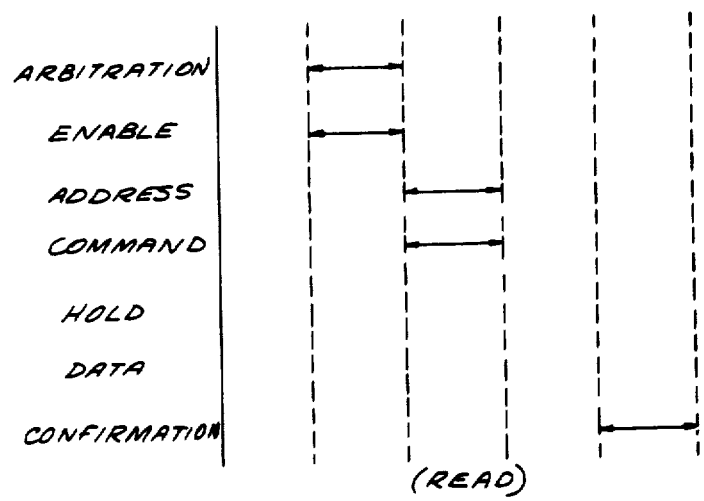
FIG. 5a is a diagram illustrating signals applied to the system bus during a typical read operation.

Referring next to FIG. 5a, a first portion of a read operation involving the acquisition of signals from main memory over the system bus is illustrated. The period reserved for the selection of the subsystem to have access to the system bus is denoted by the activity designated as arbitration. The enable signal is immediately thereafter transferred to the system that has been awarded access to the system bus. During the next system clock cycle, the command and address signals are applied to the system bus. When the command signals designate a read command, a clock cycle is skipped and on the next cycle, a confirmation signal is returned to the transmitting subsystem. If the transmitting subsystem does not receive the confirmation signal, then the signal group was not capable of being processed and that the transmitting unit should again acquire access to the bus and reapply the unprocessed signals to the system bus. The main memory subsystem applies the requested signal group to the bus by a procedure that is not necessary for understanding of the present invention.

Figure 5B:
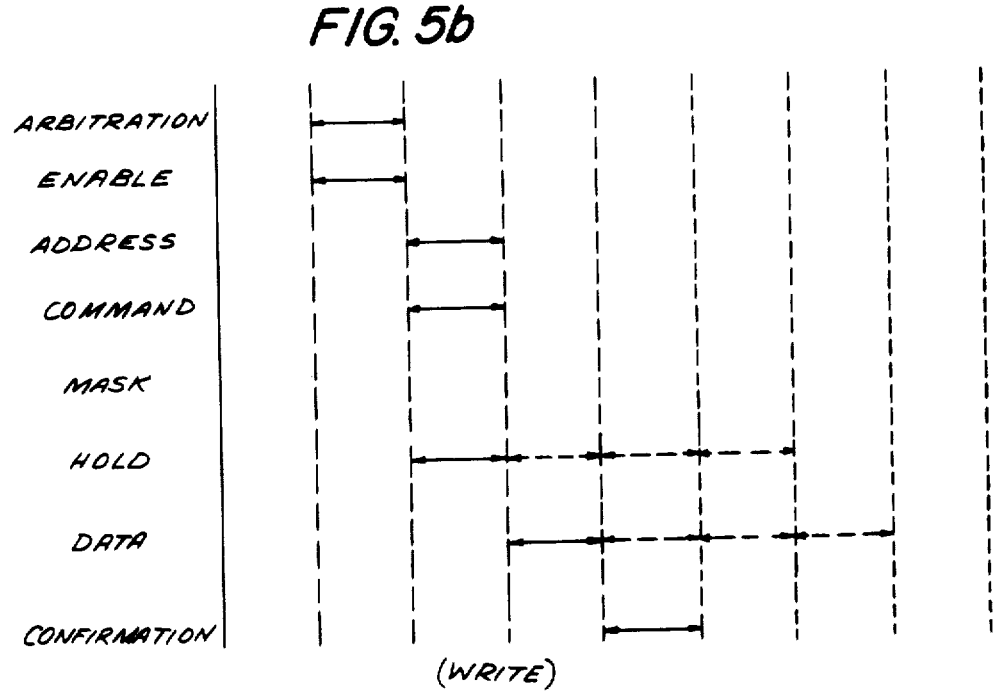
FIG. 5b is a diagram illustrating signals applied to the system bus during a typical write operation.

Referring to FIG. 5b, the procedure for a write operation is illustrated. The write operation differs from the read operation in that, as the command and address signals are applied to the system bus, a hold signal is applied by the transmitting subsystem to the arbritration unit. The hold signals permits the transmitting subsystem to maintain control of the system bus for the extra cycle required for the transmission of the data signal group. Associated with the command signals are mask signals transmitted during the data cycle. The mask signals are used when only a portion of the data signal groups is to be stored in the main memory, the remaining portions of the signal group currently stored at that location remaining the same. To implement the masked wrtie command, the memory unit includes apparatus for removing the addressed signal group from the storage cells, and replacing portions of the removed signal group with corresponding portions of the signal group that had been applied to the system bus, with the replacement portions of the signal group designated by the mask signals.

Shown in FIG. 5b with dotted lines is a four data signal group multiple write. The Hold signal is reapplied for three additional cycles and the data cycle is present for threee additional cycles. The normal multiple write operation does not utilize a masked write operation; and therefore, the masked signal lines are not used and the read operation is not initiated.

Figure 6:
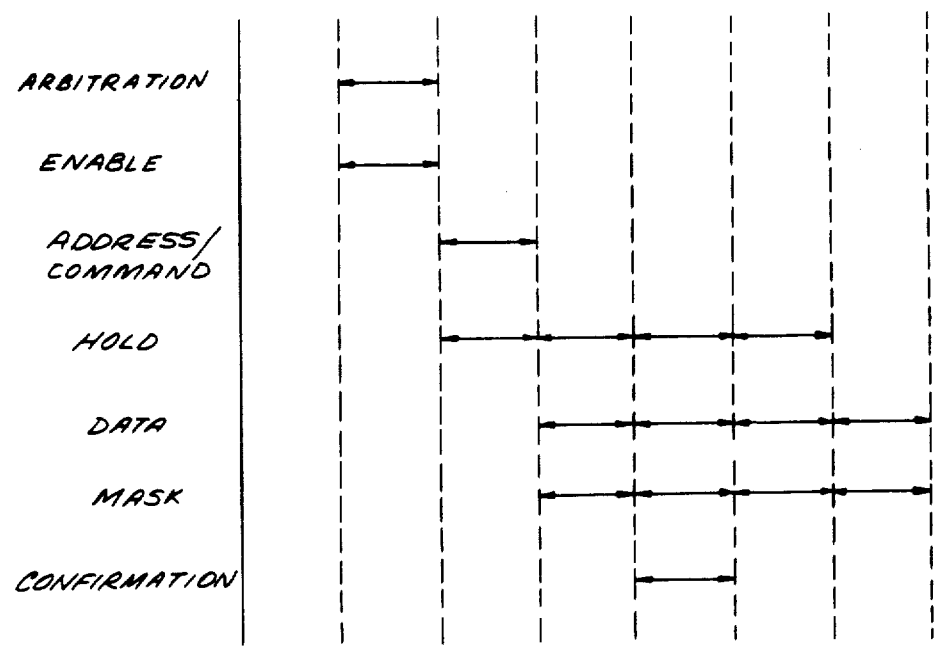
FIG. 6 is a diagram illustrating the signals applied to a system bus according to the present invention.

Referring next to FIG. 6, the signals on the system bus for implementing the multiple-write operation, according to the present invention, are shown. The command signals applied during the command and address cycle of the system bus communicate to the main memory unit that a write operation will follow and that the operation includes the application of a plurality of data signal groups during a plurality of consecutive clock cycles. The subsystem applying the signal groups to the bus will provide a Hold signal that can permit the subsystem to maintain control of the system bus for the number of cycles required to permit the signal groups to be applied to the system bus. In this operation, mask signals are associated with the associated data signal group. Thus, both mask and data signals are applied for four cycles. In this situation however, the mask signals indicate whole signal groups that are not to be stored in the main memory unit. However, the memory sybsystem does not perform the read modify write operation.

2. Operation of the Preferred Embodiment

The typical transfer of data signal groups from a subsystem to the main memory unit typically involves three system clock cycles to transfer a single data signal group. Transferring a plurality of data signal groups on a bus requires the additional time for a longer arbitration period and for the Command/Address signal transfer of a plurality of signal groups rather than for a single signal group. Similarly, the use of multiple signal group transfer, even where at least one of the group is not to be stored in the memory unit, can still result in increased system bus utilization because additional time such as is required to obtain access to the system bus is minimized.

The technique of providing the transfer of a plurality of data signal groups of the present invention used the apparatus and commands already available in the data processing system. The multiple write command and the mask control lines, associated with the masked write command, are already available and may easily be used with apparatus that can inhibit the write operation already in progress (the write operation having begun prior to analysis of the mask signals transferred with the data signal group in order to maintain the rapid transfer of the data signal groups through the memory interface unit). The central processing unit or transmitting apparatus already has the apparatus to recognize when a multiple write can be performed from data in a buffer register (not shown), so the apparatus to perform the multiple write operation with a missing signal group is easily accomplished. Similarly, the application of control signals on the lines normally used for mask signals can be readily accomplished. Finally, the multiple write command dictates that the apparatus coupled to the mask signal lines and normally responsive only during the masked write operation, responsive to the mask signal control lines during the transfer of data signal groups in the multiple write operation.

Thus, through the use of apparatus and commands already implemented in a data processing system, the multiple write operation with signal groups not to be stored in the memory unit can be implemented with apparatus and command already implemented in a data processing system. By reducing the number of times that a subsystem needs to interact with the system, including repeated unsuccessful attempts to gain access to the system bus, increased system bus utilization is possible with already available apparatus.

While the foregoing discussion has been presented in terms of the interaction between a memory subsystem and a central processing subsystem of a data processing unit, it will be clear that the same techniques can be applied to the transfer of signal groups between any apparatus with similar or superior processing capability.

The foregoing description is included to illustrate the operation of the preferred embodiment and in not meant to limit the scope of the invention. The swcope of the invention is to be limited only by the following claims. From the foregoing description, many variations will be apparent to those skilled in the art that would yet be encompassed by the spirit and scope of the invention.

What is claimed is:

1. A method for writing a given number of data signal groups to a predetermined number of memory locations in a memory unit from a computer system, said method comprising the steps of:

sending in succession at least said given number of data signal groups to the memory unit from the computer system during successive corresponding clock cycles of said computer system;

sending respective memory storage signals corresonding to respective data signal groups during respective clock cycles on mask lines;

receiving said data signal groups at a memory interface unit;

receiving said respective memory storage signals at a mask unit located within said memory interface unit;

storing said given number of data signal groups in a predetermined number of memory locations in the memory unit in response to said step of receiving said given number of data signal groups and said respective memory storage signals, said step of storing said given number of data signal groups including the substep of determining which of said predetermined number of memory locations will have said given number of data signal groups stored therein and which of said memory locations will be inhibited from storing any of said given number of data signal groups in response to said step of receiving respective memory storage signals sent on said mask lines.

* * * * *